United States Patent [19]

Cauldwell

[11] 4,348,693

[45] Sep. 7, 1982

[54] TELEVISION WEATHER RADAR SYSTEM

[75] Inventor: Jack D. Cauldwell, Carroll, Ohio

[73] Assignee: Arvin Industries, Inc., Columbus, Ind.

[21] Appl. No.: 145,631

[22] Filed: May 1, 1980

Related U.S. Application Data

[63] Continuation-in-part of Ser. No. 34,898, Apr. 30, 1979.

[51] Int. Cl.³ .............................................. H04N 5/02
[52] U.S. Cl. .................................. 358/140; 343/5 SC; 343/6 TV
[58] Field of Search ........................ 358/140, 85, 93; 343/5 SC, 6 TV; 179/2 DP

[56] References Cited

U.S. PATENT DOCUMENTS

| | | | |
|---|---|---|---|
| 3,806,915 | 4/1974 | Higgins | 340/347 AD |
| 3,810,174 | 5/1974 | Heard | 358/140 |
| 4,002,827 | 1/1977 | Nevin | 358/140 |
| 4,065,770 | 12/1977 | Berry | 343/5 SC |
| 4,099,179 | 7/1978 | Hofstein | 358/140 |
| 4,149,252 | 4/1979 | Miller | 358/140 |
| 4,167,753 | 9/1979 | Lynk | 358/140 |
| 4,196,447 | 4/1980 | Dalke | 358/82 |
| 4,214,269 | 7/1980 | Parker | 343/5 SC |
| 4,220,969 | 9/1980 | Nitadori | 343/5 SC |

*Primary Examiner*—Howard Britton
*Attorney, Agent, or Firm*—Biebel, French & Nauman

[57] ABSTRACT

Information from a weather radar system (10) is gathered by a data transmitter (20) and sent to a data receiver (25) via a telephone or data line (30). The radar video information for each radial is divided into segments and temporarily stored in a memory (45). Only the information in those segments which are to be recorded in a random access memory (140) in the data receiver (25) are transmitted. The selection within the data transmitter (20) is made by a programmable read-only memory (95), and the placement of the data into the receiver random access memory (140) is made by programmable read-only memories (130 and 135). Synchronizing pulses representing each radial (102) and antenna position (14) are also transmitted.

13 Claims, 9 Drawing Figures

TELEVISION WEATHER RADAR SYSTEM

RELATED APPLICATION

This application is a continuation-in-part of application Ser. No. 34,898, filed Apr. 30, 1979.

BACKGROUND OF THE INVENTION

Many television stations now have available access to the National Weather Service radar displays.

In one prior art system, the weather radar scope is scanned by a television type camera, digitally converted into an audio signal which is transmitted over a telephone line to a television station where they are received and stored in a random access memory. This memory is then scanned electronically to form a television picture. The various intensity levels recorded in the memory may be represented by different colors on the viewer's television screen.

In another prior art television system, radar video information is digitized and stored in an electronic memory. The entire contents of that memory are then transmitted over voice-grade telephone lines to a television station where they are received and stored in another electronic memory which is then interrogated and only those signals necessary to form a television-compatible signal are used by the television station. Since the entire weather picture is recorded, and transmitted in its entirety over the telephone lines, this device requires a substantial memory and considerable time for the radar picture to be transmitted and then presented as a television picture.

The National Weather Service radar employs a rotating antenna through which pulses of radio frequency energy are transmitted at a repetition rate selected according to the range of the system. By way of example, a radar observing weather conditions within a 150 mile radius might use a pulse repetition rate of 164 pulses per second from an antenna which makes a complete revolution in twenty seconds, and therefore there will be 3280 radials extending from the antenna. A cathode ray scope displays the received information visually in a polar coordinate format on a plan position indicator scope.

It would be desirable if the video weather information received by the radar could be connected directly to the telephone line and sent to the remote location without requiring an additional scanning device; however, it is also important to avoid transmitting unwanted or unneeded information in order to conserve transmission time and bandwidth.

SUMMARY OF THE INVENTION

This invention relates to a weather radar system for transmitting efficiently information directly from a weather radar unit to a remote location via telephone lines.

The weather radar video information and antenna position information are analyzed and only that portion of the information which is to be stored in the random access memory at the television station is transmitted over the telephone line, a radial at a time, immediately after the radar video is received and while the radar video from the next selected radial is being received. Therefore, the time required for transmitting essential data is substantially reduced, allowing the radar picture to be updated more frequently, and thereby permitting viewers to see the weather radar depiction on a substantially continuous real time basis.

In the present invention, the rectangular coordinate format of the weather depiction used by the television station is first established with each element within a random access memory storing one pixel or picture element. The random access memory in the preferred embodiment is 256×256 by 3-bit random access memory (RAM), such as described in copending application, Ser. No. 897,281, filed Apr. 17, 1978, assigned to the same assignee as the present invention now U.S. Pat. No. 4,196,447. Each memory location contains a number representing the intensity of the radar return in a specified area.

Next, the relationship of these pixels of the radar video information is established. Since the radar video is in polar coordinate format, the radials (defined by each transmitted pulse) converge toward the center of the scope, and thus not every radial or parts thereof are needed to define the information to be stored in the random access memory.

In the typical weather radar described above, having 3280 radials defined for each antenna revolution, at the 150 mile range, the radials are separated by approximately 0.29 miles. This spacing becomes closer as the radar antenna is approached. Since this spacing is closer than necessary or desired, even at the maximum range of the radar, only a few of the radials, preferably one out of eight, are used by this invention.

Each radial is divided into a plurality of segments, each representing a specified distance from the antenna, but only those segments corresponding in location to a pixel which is to be stored in the random access memory are transmitted over the telephone lines to the receiver.

Accordingly, it is an object of this invention to provide an improved system for transferring information directly from a weather radar to a television station, transmitting only those picture elements to be used by the television station, thus reducing to a minimum transmission time and bandwidth.

More specifically, another object of this invention is to provide a method for transmitting data generated in polar coordinate format from a weather radar having a rotating antenna to a remote location for storage in a rectangular coordinate format, the method comprising the steps of dividing the radar data in polar coordinate format into picture elements, selecting those picture elements having a corresponding position within a rectangular coordinate format, transmitting the selected picture elements to the remote location, and storing the selected picture elements at predetermined locations within a memory at the remote location.

It is another object of the invention to provide a method for transmitting data generated in polar coordinate format from a weather radar having a rotating antenna to a remote location via a data line for storage in a rectangular coordinate format comprising the steps of selecting predetermined spaced radials from the radar output, dividing each selected radial into a predetermined number of segments and converting the amplitude of the signal within each segment into a digital signal, selecting those digital signals corresponding to positions within the rectangular coordinate format, and transmitting the selected digital signals over the data line for storage within a memory at a remote location.

It is also an object of this invention to provide an apparatus for transferring data in substantially real time from a weather radar to a remote location for storage in a data receiver, said apparatus including means responsive to the radar output for digitizing the radar video signals, means for storing temporarily said digitized radar video signals as they are generated, memory means for identifying selected digitized signals having a corresponding position in a rectangular coordinate format, and means responsive to said memory means for transferring said selected signals to the data receiver.

It is a further object of this invention to provide an apparatus for transmitting data in substantially real time from a weather radar to a remote location over a data line for storage in a data receiver, said apparatus including means for digitizing the radar video output signals a radial at a time, a pair of storage means for storing temporarily the digitized radar video signals from alternate selected radials, memory means for selecting those digitized signals stored in said storage means having a corresponding position in a rectangular coordinate format, means for selecting one of said storage means for storing the digitized radar video from one selected radial as it is being received by the radar while the information previously stored in the other storage means is being read out in accordance with the instructions from said memory means, and means responsive to said memory means for transmitting said selected signals over the data line.

It is another object of this invention to provide an apparatus for transferring data in substantially real time from a weather radar to a remote location for storage in a data receiver, said apparatus including means responsive to the radar output for digitizing the radar video signals, means for storing temporarily said digitized radar video signals as they are generated, memory means for identifying selected digitized signals having a corresponding position in a rectangular coordinate format, and means responsive to said memory means for transferring said selected signals to the data receiver.

It is a further object of this invention to provide an apparatus for transmitting data in substantially real time from a weather radar to a remote location over a data line for storage in a data receiver, said apparatus including means for digitizing the radar video output signals a radial at a time, a pair of storage means for storing temporarily the digitized radar video signals from alternate selected radials, memory means for selecting those digitized signals stored in said storage means having a corresponding position in a rectangular coordinate format, means for selecting one of said storage means for storing the digitized radar video from one selected radial as it is being received by the radar while the information previously stored in the other storage means is being read out in accordance with the instructions from said memory means, and means responsive to said memory means for transmitting said selected signals over the data line; and to provide further an apparatus including means connected to the data line for receiving the digitized signals, storage means for storing said digitized signals, and memory means for directing said digitized signals to predetermined locations within said storage means.

It is another object of the invention to provide an apparatus for receiving weather data transmitted from a remotely located radar and for storing said data in a large scale memory which may be interrogated to display the weather data stored therein in a television format, wherein only those portions of the radar video in polar coordinate format corresponding to the rectangular coordinate format of the large scale memory are transmitted along with synchronizing signals in order to conserve transmission time, said apparatus including means for detecting the transmitted data signals, means for sensing the synchronizing signals, a large scale memory, and memory means responsive to the synchronizing signals for directing the data signals from said detecting means for storage in a rectangular coordinate format in said large scale memory.

Other objects and advantages of the invention will be apparent from the following description, the accompanying drawings and the appended claims.

DESCRIPTION OF THE PREFERRED EMBODIMENT

Figure 1:
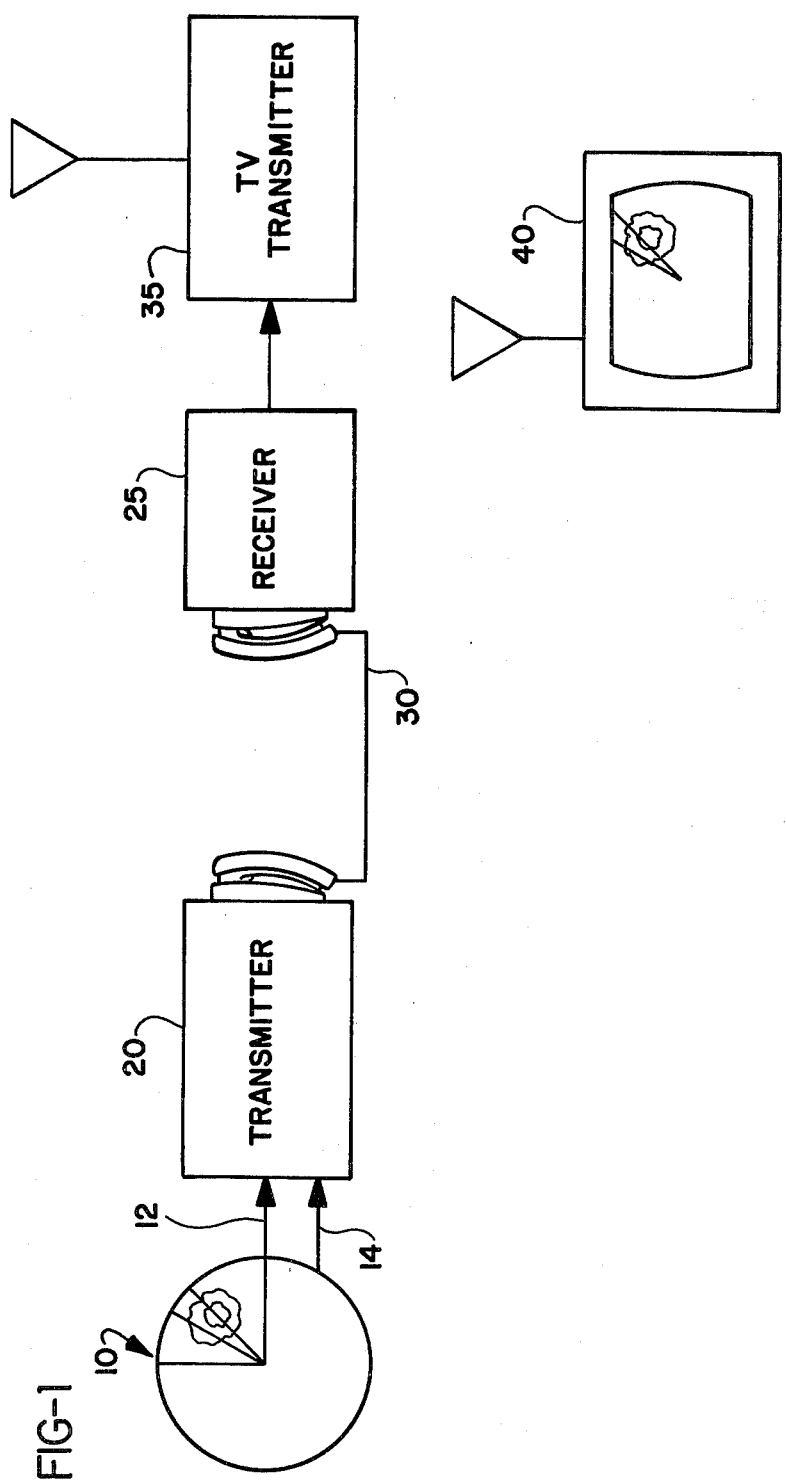
FIG. 1 is a block diagram of a weather radar to a television station data transmission system.

Referring now to the drawings which describe a preferred embodiment of the invention, and particularly to FIG. 1, a conventional National Weather Service radar, such as a WSR-57 series unit, shown generally at 10, provides video information on line 12 and an antenna position information on line 14 to a data transmitter 20.

The weather radar displays its information on a plan position indicator scope in a polar coordinate format. The resolution of the signals thus presented is significantly greater than the resolution of the signals needed for television display purposes. Therefore, only selected video information will be gathered by the data transmitter 20 for transmission to a data receiver 25 via telephone line 30.

In addition to video information, synchronizing signals relating to antenna position and the amount of data for each radial are also carried by the telephone line 30 to the receiver so that the video information may be recorded in a random access memory in preselected locations. This data is then made available for electronic scanning and input to a television transmitter 35. The general public may then view the radar weather depiction on their television sets 40.

In a preferred embodiment of the invention, only one out of every eight radials of the WR-75 radar is sampled. With a pulse repetition rate of 164 pulses per second, and an antenna rotation rate of 20 seconds, 3280 radials are generated by the radar, but since only one use of every eight is sampled, the television system will use only 410 of these radials. Since each radial is approximately 6.09 milliseconds in duration, there will be a 42.6 millisecond pause following the recording of the video information from a selected radial at the transmitter and the beginning of the next radial to be recorded. It is during this pause that the selected information from the selected radial is transmitted via the telephone line to the data receiver.

Each radial is divided into 64 segments, thus providing a maximum 26,240 picture elements (pixels). However, not all of these pixels are essential to the development of the radar depiction for television use since these are to be recorded in rectangular format. Therefore, the number of pixels transmitted is equivalent to $\pi r^2$ or $\pi \times 64^2$ or 12,868 pixels. These may be easily recorded in a 128×128 random access memory in the data receiver. (Actually, the data receiver includes a 256×256 by 3-bit random access memory, and this provides for expanded resolution, when needed.)

The position of each pixel to be recorded in the random access memory will determine which segments within each of the 410 radials are to be transmitted.

Since only 12,868 of the 26,240 radar generated pixels are transmitted to the receiver, the remaining pixels being either ignored or discarded prior to transmission, the total transmission time required is considerably reduced.

Figure 5:
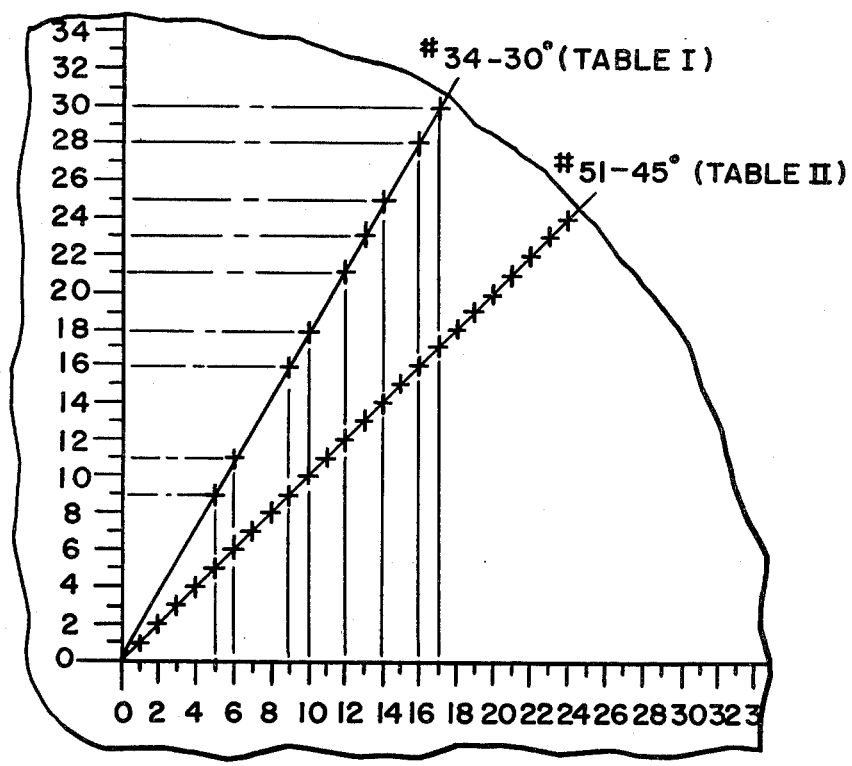
FIG. 5 is a chart showing the relationship between the picture element to be recorded in a random access memory and the picture elements developed along two selected radials of the radar.

FIG. 5 illustrates how the segments of each radial access memory are selected. The random access memory is divided into four quadrants with its center X, Y coordinate designated as 0, 0. Also, it is noted that the polar coordinate depiction on the radar scope can also be divided into four quadrants, and each of the quadrants can be divided into two sectors which are mirror images of each other. Therefore, in creating a look-up table for assigning pixels from the radar to the random access memory in the data receiver, the look-up table need only contain the absolute values for those radials within ⅛ of a circle, or 51 radials in the embodiment described. Appropriate signs for storing the information in the random access memory are given according to the sector being scanned by the radar. The description herein will thus be limited to describing one 45° sector, it being understood that the other sectors can be developed using the concepts described.

Since there are 410 radials for each complete rotation of the antenna, each radial will include an angle of 0.88°. Therefore, the radial on which an X,Y coordinate lies will be defined as (arctan X/Y)/0.88°. The segment within the radial in which the pixel falls is the square root of the sum of the squares of X and Y ($\sqrt{X^2+Y^2}$).

By way of example, the pixel which is to be stored at position X=5, Y=9 (which is the geometric center of 5.5 and 9.5) in the random access memory, will be found on radial number 34 (30°) in segment No. 11.

Radical Calculation:
(arctan 5.5/9.5)/0.88° =
(arctan 0.58)/0.88° =
30.07°/0.88° = 34.17 = 34

Sector Calculation:

$\sqrt{5.5^2 + 9.5^2} = \sqrt{30.25 + 90.25} =$ 120.50 = 10.98 = 11.

As illustrated in Tables I and II only 31 of the 64 segments in radial 34, and 47 of the 64 segments in radial 51 are selected for transmission. With this invention, not all of the video information contained in any given radial will be transmitted; only those pixels necessary to develop fully a weather picture for use by a television station, thus using efficiently the time available for transmitting data.

TABLE I

| RADIAL #34 (30°) | | | | | |
|---|---|---|---|---|---|
| X | Y | Segment # | X | Y | Segment # |
| 5 | 9 | 11 | 23 | 41 | 48 |
| 6 | 11 | 13 | 24 | 42 | 49 |
| 9 | 16 | 19 | 25 | 44 | 51 |
| 10 | 18 | 21 | 26 | 45 | 53 |
| 12 | 21 | 25 | 26 | 46 | 54 |
| 13 | 23 | 27 | 27 | 47 | 55 |
| 14 | 25 | 29 | 27 | 48 | 56 |
| 16 | 28 | 33 | 28 | 49 | 57 |
| 17 | 30 | 35 | 28 | 50 | 58 |
| 18 | 32 | 37 | 29 | 50 | 58 |
| 19 | 33 | 39 | 29 | 51 | 59 |
| 19 | 34 | 40 | 30 | 52 | 61 |
| 20 | 35 | 41 | 30 | 53 | 62 |
| 21 | 37 | 43 | 31 | 54 | 63 |
| 22 | 39 | 45 | 31 | 55 | 64 |
| 23 | 40 | 47 | | | |

TABLE II

| RADIAL #51 (45°) | | | | | |
|---|---|---|---|---|---|
| X | Y | Segment # | X | Y | Segment # |
| 1 | 1 | 2 | 25 | 25 | 36 |
| 2 | 2 | 4 | 26 | 26 | 37 |
| 3 | 3 | 5 | 27 | 27 | 39 |
| 4 | 4 | 6 | 28 | 28 | 40 |
| 5 | 5 | 8 | 29 | 29 | 42 |
| 6 | 6 | 9 | 30 | 30 | 43 |
| 7 | 7 | 11 | 31 | 31 | 45 |
| 8 | 8 | 13 | 32 | 32 | 46 |
| 9 | 9 | 13 | 33 | 33 | 47 |
| 10 | 10 | 15 | 34 | 34 | 49 |
| 11 | 11 | 16 | 35 | 35 | 50 |
| 12 | 12 | 18 | 36 | 36 | 52 |
| 13 | 13 | 19 | 37 | 37 | 53 |
| 14 | 14 | 21 | 38 | 38 | 54 |
| 15 | 15 | 22 | 39 | 39 | 56 |
| 16 | 16 | 23 | 40 | 40 | 57 |
| 17 | 17 | 25 | 41 | 41 | 59 |
| 18 | 18 | 26 | 42 | 42 | 60 |
| 19 | 19 | 28 | 43 | 43 | 62 |
| 20 | 20 | 29 | 43 | 44 | 62 |
| 21 | 21 | 30 | 44 | 44 | 63 |
| 22 | 22 | 32 | 44 | 45 | 64 |
| 23 | 23 | 33 | 45 | 45 | 64 |
| 24 | 24 | 35 | | | |

Figure 2:
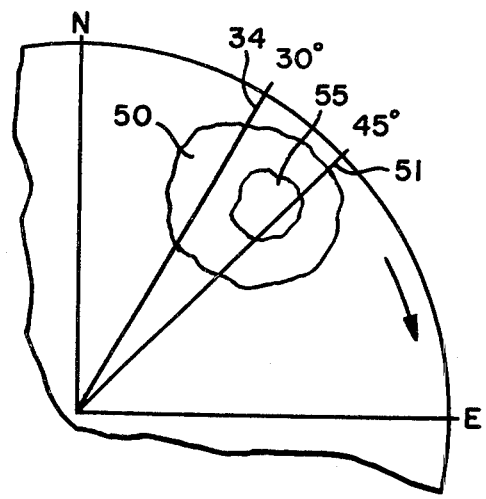
FIG. 2 is a view of a portion of a weather radar plan position indicator.

Referring now to FIG. 2, a storm 50 is shown in the Northeast quadrant of that portion of the display on the weather radar plan position indicator. This storm has a high intensity region 55 in the center portion thereof. Two radials are illustrated, radial 34 at the 30° position, and radial 51 at the 45° position.

Figure 3:
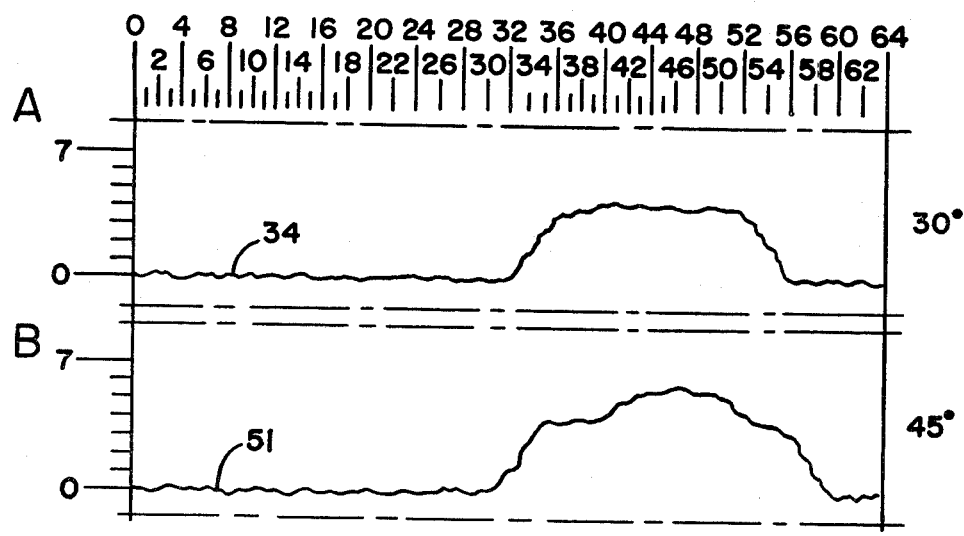
FIG. 3 is a diagram showing the waveforms representing received radar signals at two selected antenna positions.

The intensity of the radar return signals is illustrated in FIGS. 3A and B. In FIG. 3A, the signal from radial 34 is shown as being at a low level until it reaches the edge of the storm at approximately segment 32 where it then increases and then subsequently decreases toward the zero level at about segment 56. Radial 51, corresponding to the 45° position is illustrated in FIG. 3B where the high intensity portion of the storm extends from segment 41 through segment 52.

Figure 4:
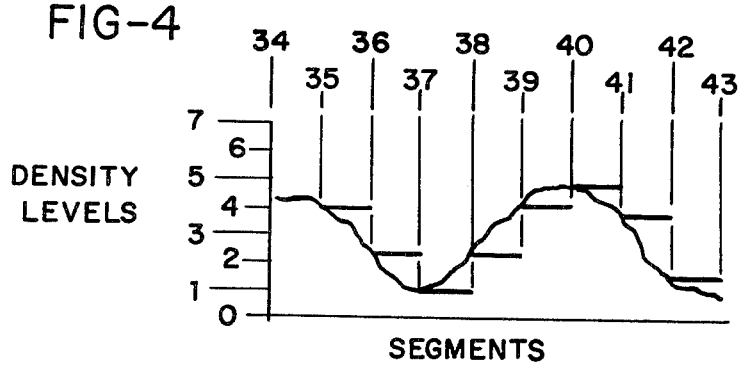
FIG. 4 is a waveform diagram showing in detail a portion of one waveform of FIG. 3.

FIG. 4 represents a detailed view of a portion of radial 34 represented in FIG. 3A. In the present invention, a 3-bit code is used to represent the intensity level of the radial return signal within each segment, and thus giving a total of eight different levels which can be recorded in the random access memory: level 0 through level 7. As will be explained, a sample and hold circuit is used to capture the intensity of the signal within each segment, and it is that intensity which is converted to digital form and transmitted via the telephone line to the random access memory within the data receiver.

Figure 6:
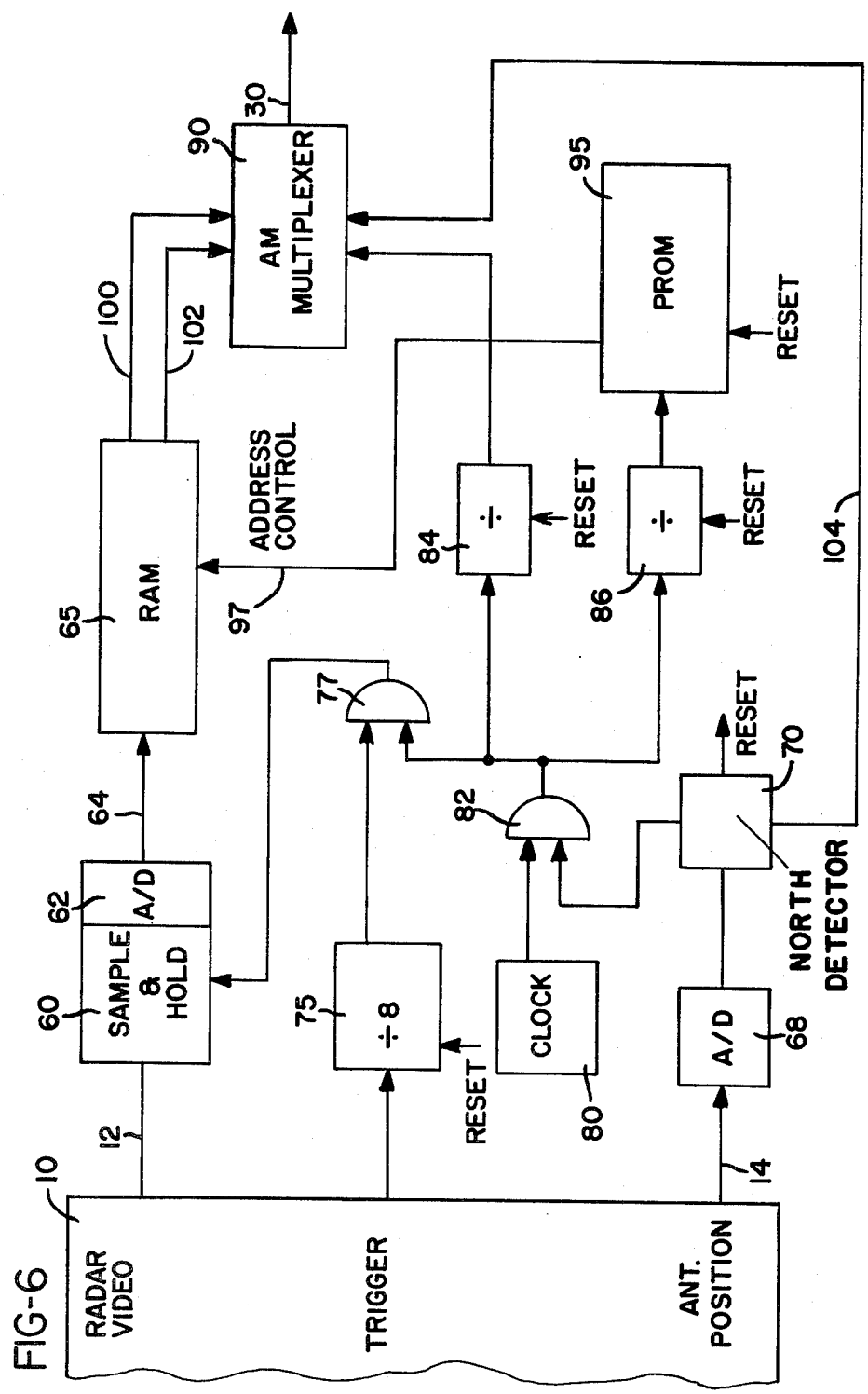
FIG. 6 is a generalized block diagram of a data transmitter.

Referring now to the block diagram in FIG. 6 of the data transmitter, radar video information from the radar unit 10 is carried on line 12 to a sample and hold circuit 60. As explained in connection with FIG. 4, the sample and hold circuit takes the analog signal present at specific intervals of time, and retains the magnitude of that signal until the next segment. During this interval, an analog to digital converter circuit (A/D) 62 converts that analog level into a digital signal, a 3-bit code in the preferred embodiment, and this signal is then transferred via line 64 to a random access memory (RAM) 65.

The random access memory 65 is a 64 by 3-bit device which acts as a shift register for incoming data, and therefore each of the 64 segments into which each of the 410 radials is divided will be temporarily stored into the memory.

Radar antenna position information from a synchro device connected to the antenna is provided to an analog or syncro-to-digital converter (A/D) 68 accepts a signal from the five wires interconnecting the syncro-transmitter at the antenna with the syncro-receiver associated with the plan position indicator within the radar unit. The syncro-to-digital converter provides a 10-bit digital output to a North detector 70, an output of which provides reset and other antenna position signals so that the entire system may be synchronized.

A radar unit 10 also provides a trigger pulse during each transmission of a radar signal, thus defining the start of each radial. Since the preferred embodiment utilizes one of every eight radials from the radar unit, the trigger pulses are applied through a divide-by-eight counter 75, the output of which is applied through AND gate 77 to the sample and hold circuit 60. A system clock 80, preferably set at approximately 14 MHz, also has an output connected to the AND circuit 77, and it is the output of this clock which defines the segment into which each of the selected radials are divided. The output of clock 80 passes through AND gate 82, one input of which is from the North detector circuit 70.

The clock output is also connected through divider circuits 84 and 86 to the AM multiplexer circuit 90 and to a data selection programmable read only memory (PROM) 95.

The PROM 95 provides address controls to the RAM 65 to interrogate selected segments with the RAM during that time interval which exists between the recording of information from one radial and the beginning of the receipt of information from the next succeeding selected radial. The digital output of the RAM for each of the selected segments is transmitted serially via line 100 to the AM multiplexer 90 where it is converted into an audio tone, typically in the range of 1200 to 1800 Hz, the frequency being a function of the digital code for each segment. The RAM 65 also provides a special code on line 102 indicating that all of the selected information from the RAM for a particular radial has been read.

Since there is 6.098 milliseconds between transmitting pulses from the radar and only one out of eight radials is sampled, there will be a pause of 42.68 milliseconds between the end of a sample radial and the beginning of the next radial to be sampled, and it is during this interval that data in the RAM 65 is read and transferred through the AM multiplexer 90 onto the telephone line 30.

The PROM 95 contains instructions for selecting those segments in each of the radials one through 51 which comprise ⅛ of the entire scan. Once the PROM reaches segment 51, it reverses and counts back down, repeating this operation, counting forwards and backwards, until a complete revolution of the antenna has been accomplished.

The North detector 70 also provides an output on line 104 to the AM multiplexer 90 to provide a synchronizing code to the data receiver indicating that the antenna has passed North, or some other preselected position, thereby enabling the information to be transmitted and latter to be properly placed in the random access memory contained in the data receiver.

Figure 7:
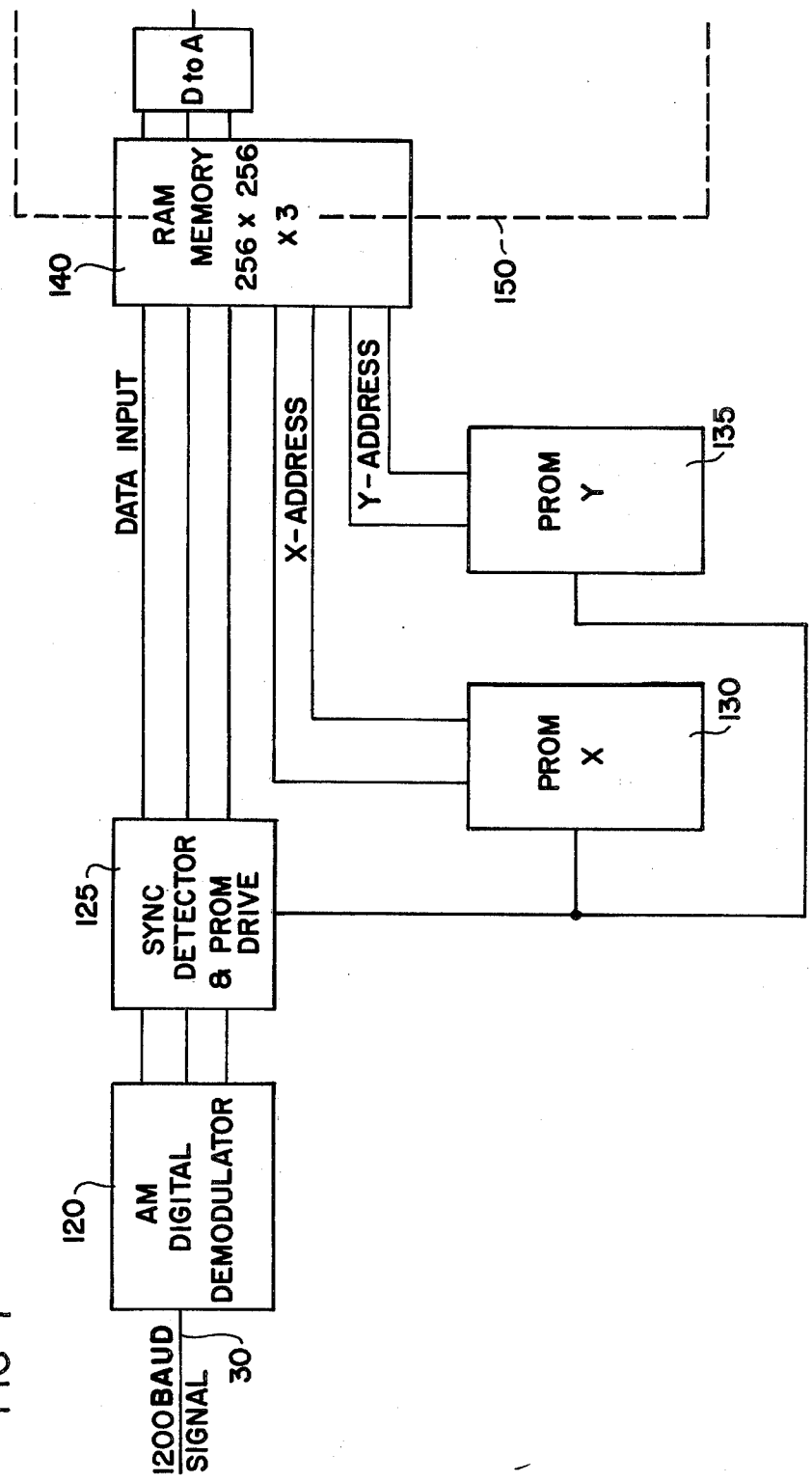
FIG. 7 is a generalized block diagram of a data receiver.

Referring now to FIG. 7, which is a block diagram of a data receiver constructed according to this invention, the audio tones representing input data on line 30 are applied to an AM digital demodulator 120, the output of which is a 3-bit code which passes through the sync detector and PROM drive circuit 125. This device senses the sync signal from the data transmitter representing North, or the start of the data transmission for a particular sector, and this North signal sets PROMs 130 and 135 to zero (or some particular value).

The sync detector 125 also senses the signal from the RAM 65 representing the end-of-radial code, causing the PROMs 130 and 135 to advance one unit. PROM 130 controls the X-address in a random access memory 140 while PROM 135 controls the Y-address.

Thus, in operation, once the antenna passes North (or some other predetermined location), the data selection PROM 95 is set to zero (or some preselected value), a synchronizing signal will be set to reset the address PROMs 130, 135 in the data receiver, information from the first radial will be divided into sectors under the direction of the clock 80 and the sample and hold circuit 60, converted to digital form by the analog to digital converter 64, and serially read into and stored by the random access memory 65.

Only those segments within the first radial which have been preselected to be stored in the RAM 140 will be selected by operation of PROM 95, and these will be sent in sequence in serial form over the data transmission line 30. When all selected segments have been sent, a special code indicating the end-of-radial will be sent, thus causing the PROMs 130 and 135 to advance to the next position preparatory to receiving the next radial. Thus, each radial in turn will be sampled and divided into segments with the amplitude of the signal within each segment being converted to digital form; but only those segments which are to be stored in the RAM 140 will be transmitted over the data transmission line 30, as selected by PROM 95.

It may be desirable to transmit only alternate selected segments from each radial during one rotation of the antenna, with the missing segments being provided during the next antenna revolution.

In this case, the time required to transmit that portion of the data from each radial will be significantly less than the total time available (from the end of the end of recording the information from one radial to the beginning of the next radial), and it will be possible therefore to provide other synchronizing signals to program the PROMs 95, 130 and 135 so that it would not be necessary for the antenna to first pass North before information transfer begins.

The PROM 95 in the data transmitter therefore contains a lookup table for a 45° sector, or 51 radials. In the preferred embodiment, PROMs 95, 130 and 135 each comprise two 2K by 8-bit programmable read-only memories.

The random access memory or large scale storage device 140 is included within a television weather depiction system 150, as described in U.S. Pat. No. 4,196,447. The information contained within this memory is scanned to produce a picture in television format of that information which has been transmitted directly from the weather radar via the data or telephone line 30.

Figure 8:
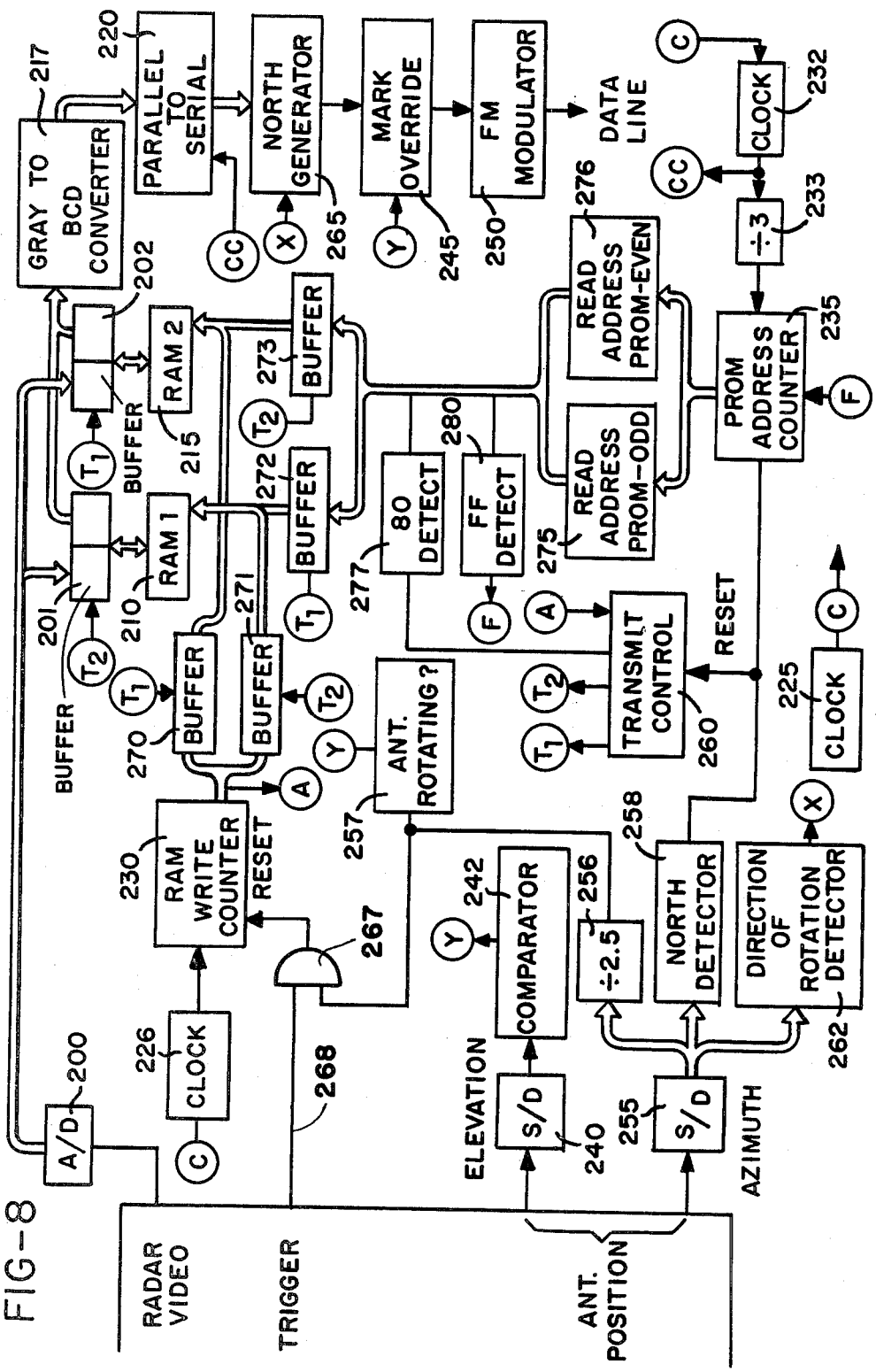
FIG. 8 is a nonspecific block diagram of the data transmitter.

Referring now to FIG. 8, which shows a preferred embodiment of a data transmitter, an A/D converter 200 digitizes or converts the incoming radar video signal 12 into a 3-bit Gray code signal which is applied through tristate buffers 201, 202 for temporary storage in one of two RAMs 210, 215. Output codes 000 and 111 are used for other purposes, so the A/D 200 will provide an output within the range of 1 to 6 to represent the intensity of the radar return.

Since the Gray code is stored in the RAMs 210, 215, a Gray code to BCD converter 217 is provided on the output line from the RAMs to the parallel to serial converter 220.

A master clock 225 provides an output to clock 226 to control the RAM write counter 230; and another output to clock (or divider) 232 to the parallel to serial converter 220 and through an additional divider network 233 to a PROM address counter 235.

Antenna position information is applied to two separate S/D converters. S/D 240 senses elevation information, and its output is applied to a comparator 242. If the antenna elevation is greater than 1.5°, then the comparator 242 provides an output Y to a mark override circuit 245 which places a continuous mark signal into the input of the FM modulator 250. Normally, the weather radar antenna is positioned at 0.9° in order to provide the desired coverage.

The other output from the antenna position circuit provides azimuth information to another S/D 255. This device is connected to three separate circuits: (1) A divide by 2.5 counter 256 which has an output to an AND gate 267 which along with the trigger signal on line 268 controls the RAM write counter 230; and also antenna rotation sensing circuit 257 which is also applied to the mark override circuit 245 so that the device will provide output signals only when the antenna is rotating at the proper rate; (2) a North detector circuit 258, the output of which is connected to the transmit control 260 and the PROM address counter 235; (3) a direction of rotation detector circuit 262, the output of which is applied to a North generator 265.

The North generator circuit 265 provides a unique signal whenever the antenna passes its North position, and it provides a signal of one type when the antenna is rotating clockwise and signal of a different type when the antenna is rotating counterclockwise. This signal will be applied over the data line and will take priority over any signals which are provided by the RAMs 210, 215 through the parallel to serial converter 220. Since the output of the A/D 200 can be neither 000 nor 111, these codes are used as part of the North generator signal.

The digitized output of the A/D 200 is applied to the storage means or RAMs through a pair of tristate buffer circuits 201, 202. The RAMs have one set of terminals used for input and output, and therefore the three data lines coming in form the A/D must be selectively applied to either RAM-1 or to RAM-2 while the output of the other RAM may be interrogated and applied to the parallel to serial converter 220. All of this takes place under the control of the transmit control circuit 260.

The transmit control circuit 260 is reset on a North pulse, and has a pair of outputs T1 and T2 which control the operation of several tristate buffer circuits within the transmitter. The purpose of this control is to select one RAM to record video information from the radar while information previously stored in the other RAM is being read onto the data line.

The clock 226 provides an output pulse which occurs each two radar miles, and this pulse is applied to the RAM write counter 230, the output of which is applied through one of the buffers 270, 271 to one of the RAM circuits 210, 215 which then records the information applied thereto from the A/D 200. At the same time, information previously stored in the other RAM is being read in accordance with instructions provided by one of the read address PROMs 275, 276 through buffers 272 and 273. The proms 275, 276 are memory devices which select those picture elements in the digitized polor coordinate radar video stored in the RAMS 210, 215 which have a corresponding position in the reactangular coordinate memory in the remotely located data receiver.

Before the RAMs are switched, several conditions must first exist. First, all of the information in the PROMs 275 or 276 must have been read out, and therefore a "80" detector circuit 277 is provided to sense the symbol 80 recorded in the PROM indicating that the interrogation process has been completed. Second, the RAM write counter 230 must have completed its operation so that all of the information which is to be stored from a given radial has been recorded. This is indicated by an output on line A. When both of these conditions have been met, the transmit control 260 will toggle, and the RAMs will switch places, i.e., the RAM which previously recorded information will now be in a position to be interrogated.

Upon the next trigger pulse on line 268, the RAM write counter 230 will begin anew, and the other RAM will then begin recording incoming radar video information.

In the present invention, two complete revolutions of the antenna are required in order to complete a single radar picture. Since the antenna rotates at approximately once every twenty seconds, it will take two revolutions or forty seconds for a complete picture to be developed.

Thus, during one revolution of the antenna, the video information from each selected radial is alternately read into one of the accumulators or RAMs 210 or 215 while at the same time, alternate segments in the other RAM are being interrogated under the direction of one of the PROMs 275 or 276 and the information transmitted over the data line. For example, during one revolution of the radar antenna, RAM 275 will be active and only odd numbered segments within RAMS 210 and 215 will be interrogated and sent over the data line, then during the next revolution of the antenna, RAM 276 will be active and the in-between or even numbered segments interrogated and transmitted. By transmitting alternate segments of each selected radial, the weather picture displayed will not change substantially from one revolution of the radar antenna to another. The selection of the PROMs is under the direction of the north detector 258.

Also, in order to conserve memory space in the PROMs, only ⅛th of a revolution need be recorded in either of the PROMs 275, 276, and therefore the PROMs will be counted up and then counted down, then up again and down again eight times during one revolution of the PROM address counter, and a "FF" detect circuit 280 is used to indicate whenever a PROM has reached the limit of its operation. When the symbol FF is received, the counter 235 will begin counting the other direction.

Figure 9:
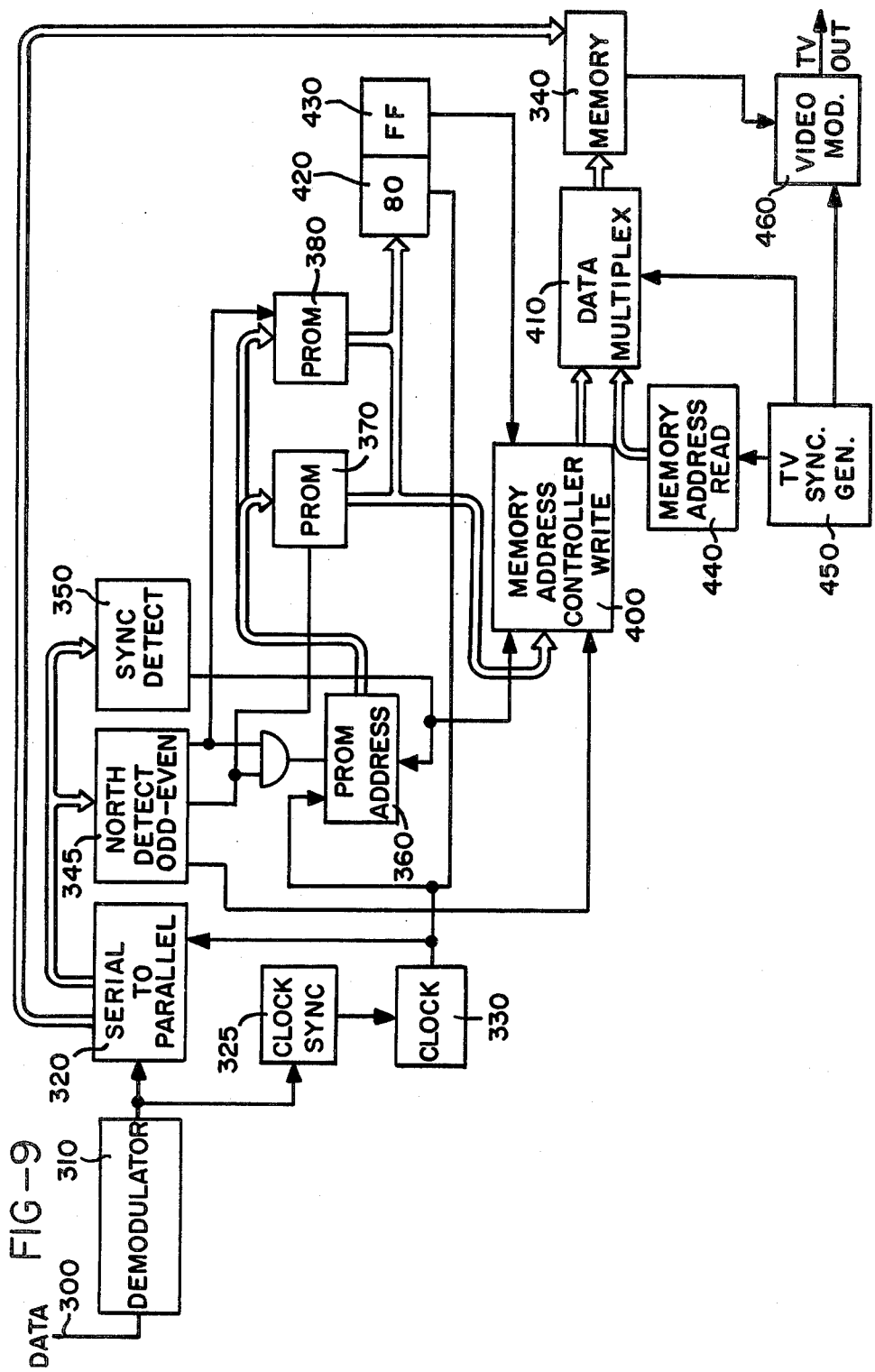
FIG. 9 is a more specific block diagram of the data receiver.

Reference is now made to FIG. 9 which illustrates a preferred embodiment of the data receiver. Incoming data on telephone line 300 is detected by a data translator or demodulator circuit 310 whose output is connected to a serial to parallel converter 320. The data on line 300 is a frequency modulated signal, and the output of the demodulator 310 comprises digital signals representing logic levels one and zero.

The serial to parallel converter 320 includes one three line output which is connected directly to a large scale memory or storage device 340; and it also includes an eight line circuit which is connected to a North detector 345 and sync detector circuit 350.

The demodulator output is also applied to the clock synchronizing circuit 325, the output of which controls the operation of a clock 330. The synchronizing circuit 325 senses the leading and the trailing edge of each of the pulse outputs of the demodulator 310.

The clock 330 provides output pulses which occur at a ninety degree phase angle with respect to the incoming pulses in order to provide proper timing for the circuit. Synchronizing pulses and North pulses comprise three mark or three space signals together, and therefore the clock 330 will provide an output during the center of each of these pulses, and the clock synchronization circuit 325 merely insures that the clock is in phase with the incoming data.

The output of the clock 330 is applied to a PROM address counter 360 which is reset on the occurrence of each North pulse and which is incremented or decremented every 3-data bits or each pixel by the outputs from the sync detector 350 and North detector circuit 345.

Each radial is identified by three mark pulses (111) followed by three space pulses (000). There are other circuits within the receiver to prevent the pulse detection of these combinations of pulses.

The PROM address counter 360 has a 10-bit output connected to the PROMs 370 and 380 (8-bit outputs), each of which consists of an X and Y address PROM. A North pulse, consisting of three marks (111) followed by three spaces (000) followed by three additional marks (111) represents the "odd" field while three marks (111) followed by six spaces (000000) followed by three marks (111) represents an "even" field. Two North pulses, either odd or even, represents clockwise rotation of the antenna while one North pulse represents counterclockwise rotation. The PROM selected depends upon whether the field is odd or even.

The PROMs 370 and 380 provide address control signals to the memory address control write circuit 400, the output of which is applied through a data multiplexer 410 to the large scale memory or storage device 340.

An "80" detector 420 is connected to the output of the PROMs 370 and 380, and when an "80" symbol is detected, indicating that all the segments within the selected radial have been interrogated, it stops the PROM address counter 360 from continuing its advance until the next sync pulse is detected. An "FF" detector 430 also senses the output of the PROMs 370 and 380, and when an "FF" symbol is detected, indicating that all the information in the PROM has been read, it provides an output to reverse the direction of operation of the output memory address control write circuit 400. It is also reset by a sync pulse.

Although not specifically a part of this invention, the data multiplexer 410 also receives signals from the memory address read counter 440 in response to signals from the TV generator 450 in order for the information contained in the memory 340 to be read out in proper TV format. The multiplexer 410 also receives a signal from the TV sync generator 450 which causes the newly generated or incoming weather information to be read into the memory at the appropriate time intervals so that it does not interfere with the television format readout, as described in the above-identified copending application. A video modulator 460 may be connected to the output of memory 340 and TV sync generator 440 to provide television compatible radio frequency output signals.

While the method herein described, and the form of apparatus for carrying this method into effect, constitute preferred embodiments of this invention, it is to be understood that the invention is not limited to this precise method and form of apparatus, and that changes may be made in either without departing from the scope of the invention which is defined in the appended claims.

What is claimed is:

1. Method for transmitting data generated in polar coordinate format from a weather radar having a rotating antenna to a remote location for storage in a rectangular coordinate format, the method comprising the steps of
    dividing the radar data in polar coordinate format into picture elements,
    selecting those picture elements having a corresponding position within a rectangular coordinate format,
    transmitting the selected picture elements to the remote location, and
    storing the selected picture elements at predetermined locations within a memory at the remote location.

2. The method of claim 1 wherein the selected picture elements are transmitted to the remote location substantially as they are generated by the radar.

3. Method for transmitting data generated in polar coordinate format from a weather radar having a rotating antenna to a remote location via a data line for storage in a rectangular coordinate format comprising the steps of
    selecting evenly spaced radials from the radar output,
    dividing each radial into a predetermined number of segments,
    converting the amplitude of the signal within each segment into a digital signal,
    storing temporarily all of the digital signals representing the segments within a radial, selecting only those segments corresponding to positions within the rectangular coordinate format, and transmitting only the digital signals of the selected segments on said data line.

4. The method of claim 3 further comprising the steps of
generating synchronizing signals representing the position of the weather radar antenna,
generating additional synchronizing signals representing each radial, and
transmitting said synchronizing signals over said data line.

5. The method of claim 3 further including the steps of directing the digital signals from the data line to preselected locations within a random access memory within the data receiver, and
thereafter accessing the random access memory to display the information contained therein as a weather radar depiction.

6. Method for transmitting data generated in polar coordinate format from a weather radar having a rotating antenna to a remote location via a data line for storage in a rectangular coordinate format comprising the steps of
selecting predetermined spaced radials from the radar output,
dividing each selected radial into a predetermined number of segments and converting the amplitude of the signal within each segment into a digital signal,
selecting those digital signals corresponding to positions within the rectangular coordinate format, and
transmitting the selected digital signals over the data line.

7. Apparatus for transferring data in substantially real time from a weather radar to a remote location for storage in a data receiver, said apparatus including
means responsive to the radar output for digitizing the radar video signals,
means for storing temporarily said digitized radar video signals as they are generated,
memory means for identifying selected digitized signals having a corresponding position in a rectangular coordinate format, and
means responsive to said memory means for transferring said selected signals to the data receiver.

8. Apparatus for transmitting data in substantially real time from a weather radar to a remote location over a data line for storage in a data receiver, said apparatus including
means for digitizing the radar video output signals a radial at a time,
a pair of storage means for storing temporarily the digitized radar video signals from alternate selected radials,
memory means for selecting only those digitized signals having a corresponding position in a rectangular coordinate format,
means for selecting one of said storage means for storing the digitized radar video from one selected radial as it is being received by the radar while the information previously stored in the other storage means is being read out in accordance with the instructions from said memory means, and
means responsive to said memory means for transmitting said selected signals over the data line.

9. The apparatus of claim 8 further including means connected to the data line for receiving the digitized signals,
storage means for storing said digitized signals, and
memory means for directing said digitized signals to predetermined locations within said storage means.

10. A device for transferring information derived from a weather radar over a data line to a remote location including
a data transmitter comprising
means for digitizing the radar return signals,
memory means for identifying selected radar return signals,
means for selecting a limited number of return signals in accordance with instructions from said memory means, and
means for transmitting the selected digitized signals over a data line in real time, and
a data receiver comprising
means connected to the data line for receiving the transmitted digital numbers,
a random access memory, and
memory means for directing said digitized signals to predetermined locations within said random access memory.

11. Apparatus for transferring data from a weather radar to a remote location over a data line to be stored in a data receiver including
means responsive to the radar output for dividing selected received signals into a plurality of evenly spaced segments,
means for providing a signal representing antenna position, and
means responsive to the generation of each radar output signal for generating synchronizing signals,
storage means for storing temporarily the value of the signals within each of the segments of the selected radials,
means responsive to antenna position for selecting those segments within a radial which are to be stored in the data receiver memory, and
means for transmitting said selected signals along with said antenna position signal and said synchronizing signals on the data line.

12. A device for transmitting information derived from a weather radar over a data line to a remote location, said weather radar having a rotatable antenna, means for sensing antenna position, means for transmitting radar pulses through said antenna at a predetermined rate, means for receiving reflected radar signals, and means responsive to the receiving means and said antenna position sensing means for displaying visually the received signals, said device including
a data transmitter comprising
means for selecting a limited number of received signals,
means responsive to selected received signals for dividing said signals into a predetermined number of segments, spaced apart in time,
means for converting the amplitude of said received signals within each of said segments into a digital number,
memory means for storing each of said digital numbers for each selected received signal,
means for selecting predetermined segments from the selected received signals, and means for transmitting the digital numbers in said selected segments over a data line along with synchronizing signals, and a data receiver comprising means connected to the data line for receiving the transmitted digital numbers, a random access memory, memory means responsive to said synchronizing signals for directing said digital numbers to specific locations within said random access memory, and means for accessing said memory means for displaying visually the information contained therein.

13. An apparatus for receiving weather data transmitted from a remotely located radar and for storing said data in a large scale memory which may be interrogated to display the weather data stored therein in a television format, wherein only those portions of the radar video in polar coordinate format corresponding to the rectangular coordinate format of the large scale memory are transmitted along with synchronizing signals in order to conserve transmission time, said apparatus including means for detecting the transmitted data signals, means for sensing the synchronizing signals, a large scale memory, and memory means responsive to the synchronizing signals for directing the data signals from said detecting means for storage in a rectangular coordinate format in said large scale memory.

* * * * *